(12) United States Patent
Shu et al.

(10) Patent No.: US 10,379,954 B2
(45) Date of Patent: Aug. 13, 2019

(54) METHOD AND APPARATUS FOR CACHE MANAGEMENT OF TRANSACTION PROCESSING IN PERSISTENT MEMORY

(71) Applicant: TSINGHUA UNIVERSITY, Beijing (CN)

(72) Inventors: Jiwu Shu, Beijing (CN); Youyou Lu, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 13 days.

(21) Appl. No.: 14/980,248

(22) Filed: Dec. 28, 2015

(65) Prior Publication Data
US 2016/0350216 A1 Dec. 1, 2016

(30) Foreign Application Priority Data
May 29, 2015 (CN) .......................... 2015 1 0289418

(51) Int. Cl.
*G06F 11/00* (2006.01)
*G06F 11/14* (2006.01)
*G06F 12/02* (2006.01)

(52) U.S. Cl.
CPC .......... *G06F 11/14* (2013.01); *G06F 12/0238* (2013.01); *G06F 2212/1032* (2013.01);
(Continued)

(58) Field of Classification Search
CPC .. G06F 12/0802; G06F 11/073; G06F 3/0655; G06F 3/0631; G06F 3/0685;
(Continued)

(56) References Cited

U.S. PATENT DOCUMENTS

| 6,216,215 B1* | 4/2001 | Palanca ............... G06F 12/0802 712/23 |
| 2006/0101089 A1* | 5/2006 | Parr ................... G06F 17/30286 |

(Continued)

*Primary Examiner* — Yair Leibovich
(74) *Attorney, Agent, or Firm* — Wayne & Ken, LLC; Tony Hom (57) ABSTRACT

The present invention provides a method and an apparatus for cache management of transaction processing in persistent memory. The method includes: when a transaction starts, reading old version data from non-volatile memory to a processor cache, and executing the transaction; during the execution of the transaction, allocating a space to generated new version data, and using a steal write-back technology to allow persistence of uncommitted data; when the transaction is committed or aborted, implementing forced persistence of transaction data to the non-volatile memory: after persistence of the transaction data or state is implemented to the non-volatile memory, writing the transaction data back to original data addresses, and using a no-force write-back technology to relax persistence of committed data to the non-volatile memory, where the transaction processing module periodically implements persistence of cached data to the non-volatile memory using bulk persistence; and when a system failure occurs, performing failure recovery processing on the transaction data. The method can reduce frequencies of data replication and data persistence in persistent memory.

7 Claims, 6 Drawing Sheets

(52) U.S. Cl.
CPC ...... *G06F 2212/22* (2013.01); *G06F 2212/60* (2013.01); *G06F 2212/601* (2013.01); *G06F 2212/604* (2013.01)

(58) Field of Classification Search
CPC .. G06F 11/0793; G06F 3/061; G06F 11/0751; G06F 11/0745; G06F 2212/22; G06F 2212/60; G06F 2212/202
USPC ........................................................ 714/6.11
See application file for complete search history.

(56) References Cited

U.S. PATENT DOCUMENTS

| | | | | |
|---|---|---|---|---|
| 2009/0300662 | A1* | 12/2009 | Ivanov .................... | G06F 9/541 |
| | | | | 719/328 |
| 2014/0068183 | A1* | 3/2014 | Joshi .................. | G06F 12/0866 |
| | | | | 711/114 |
| 2014/0379991 | A1* | 12/2014 | Lomet ................. | G06F 12/0891 |
| | | | | 711/135 |
| 2015/0019792 | A1* | 1/2015 | Swanson ................ | G06F 9/466 |
| | | | | 711/102 |

* cited by examiner

Format of data block

FIG. 4

Format of metadata block

METHOD AND APPARATUS FOR CACHE MANAGEMENT OF TRANSACTION PROCESSING IN PERSISTENT MEMORY

CROSS-REFERENCE TO RELATED APPLICATIONS

This application is a continuation in part of, and claims priority to, Chinese Patent Application No. 201510289418.3 with a filing date of May 29, 2015. The content of the aforementioned application, including any intervening amendments thereto, is incorporated herein by reference.

TECHNICAL FIELD

The present invention relates to the field of non-volatile memory-level storage technologies, and in particular, to a method and an apparatus for cache management of transaction processing in persistent memory.

BACKGROUND

Non-volatile memory (NVM) is a new type of byte-addressable memory-level storage device, e.g., phase change memory (PCM), spin-torque transfer RAM (STT-RAM), and resistive RAM (RRAM). The non-volatile memory has advantages such as low latency, huge bandwidth, non-volatility, and low power, with read and write performance close to that of conventional DRAM memory. In addition, the non-volatile memory provides durability same as an external storage of a conventional magnetic disk. Therefore, a memory-level persistent storage (also called "persistent memory") built by using the non-volatile memory can provide data durability at the memory level, which does not require write-back of data to a magnetic disk and greatly improves performance of a storage system.

In the storage system, data consistency is one of important features ensuring correct and reliable running of the storage system. The data consistency requires that the storage system should be able to recover to a consistent state after an unexpected failure occurs. Transaction management is one of common manners of data consistency maintenance. Transaction management combines different data accesses in a same operation into a transaction, and maintains atomicity and durability of the transaction. The atomicity requires that data updates in the transaction should be all completed or failed. The durability requires that data updates in the transaction should not be lost after a power failure occurs in the system.

There is a great difference between maintenance of data consistency in the persistent memory and maintenance of data consistency in the conventional magnetic disk storage system. The conventional magnetic disk storage system maintains the read/write state and write-back order of the transaction data in the memory to ensure that data written back to the magnetic disk can be recovered to a consistent state, The persistent memory maintains the read/write state and the write-back order of the transaction data in a CPU cache to ensure that data written back to the persistent memory can be recovered to a consistent state. The maintenance on the data cache of the conventional magnetic disk storage system is managed by an operating system and can be implemented in software, while the data cache in persistent memory is managed by the CPU cache and is implemented in hardware. in the conventional software-based transaction management manner a lot of operations such as flushing (for example, clflush) and fencing (for example, mfence) need to he introduced in persistent memory, which greatly affects the CPU cache efficiency and further affects the overall performance of the system, To reduce overheads of data consistency maintenance in, the persistent memory, some existing practices propose to implement functional expansion on the CPU cache hardware to support state tracking and guarantee the write-back order of the transaction data during the transaction processing. These practices include an epoch (epoch) mechanism proposed in a BPFS system by Microsoft Research, a strand consistency (strand consistency) mechanism proposed by University of Michigan, and a loose-ordering consistency (loose-ordering consistency) mechanism proposed by Tsinghua University. However, all these methods need to modify the CPU cache hardware.

SUMMARY

The present invention is intended to solve at least one of the foregoing technical disadvantages.

Therefore, one objective of the present invention is to provide a method for cache management of transaction processing in persistent memory. The method can reduce frequencies of data replication and data persistence in the persistent memory and improve cache management efficiency of the persistent memory in program software.

Another objective of the present invention is to provide an apparatus for cache management of transaction processing in persistent memory.

To achieve the foregoing objective, according to a first aspect of the present invention, a method for cache management of transaction processing in persistent memory is disclosed in an embodiment and includes the following steps when a transaction starts, reading, by a transaction processing module, old version data from non-volatile memory to a processor cache, and executing, by the transaction processing module, the transaction; during the execution of the transaction, allocating, by the transaction processing module, a space to generated new version data, and using a steal write-back technology to allow persistence of uncommitted data; when the transaction is committed or aborted, implementing forced persistence of transaction data to the non-volatile memory; after persistence of the transaction data is implemented to the non-volatile memory, writing the transaction data back to original data addresses, and using a no-force write-back technology to relax persistence of committed data to the non-volatile memory, where the transaction processing module periodically implements persistence of cached data to the non-volatile memory using bulk persistence; and when a system failure occurs, performing failure recovery processing on the transaction data.

in the method for cache management of transaction processing in persistent memory according to the present invention, a space is allocated directly in the non-volatile memory to new version data during transaction processing, which reduces frequencies of temporary space allocation and data replication and improves memory utilization. In addition, persistence of uncommitted data to the non-volatile memory is allowed, which reduces the cost of tracking the state of the uncommitted data. In addition, the method allows, by using persistent replicas of the committed data in remaining address spaces of the non-volatile memory, the committed data is cached in the CPU cache instead of being forced persistence, which reduces overheads of data persistence, The method has the following advantages; The transaction processing efficiency in the persistent memory is improved, and the transaction processing is implemented in program software without specific hardware support, thereby featuring better universality.

In addition, the method for cache management of transaction processing in persistent memory according to the foregoing embodiment of the present invention may further have the following additional technical features:

Further, the persistent memory includes volatile processor cache and non-volatile memory; and the transaction data is first cached in the volatile processor cache, and is written back to the non-volatile memory in an ascending order of dependencies to ensure data consistency.

Further, the steal write-back technology in persistent memory includes; during the execution of the transaction, allocating, directly in the non-volatile, memory, a space to new version data generated by the transaction to avoid performing a replication operation on the data; and recording a log area by using a data organization manner in a fixed format, and allocating corresponding metadata to a data block to enable data block state detection after the system failure, where the metadata block is used to record description information of the data block.

Further, he steal write-back technology in persistent memory further includes: if the transaction is aborted, performing the following marking on data blocks of the aborted transaction in the metadata: for data blocks that are allocated a memory space and are written back to the non-volatile memory and data blocks that are allocated a memory space but are not written back to the non-volatile memory yet, marking the data blocks of the aborted transaction by using metadata tags; and for data blocks that are not allocated a memory space, discarding the data blocks directly.

Further, the no-force write-back technology of the persistent memory includes: when the transaction is committed, replicating the committed data to locations of the old version data, and if there is a persistent replica in remaining address spaces of the non-volatile memory, allowing the data copy to be cached in the processor cache; and delaying persistence of the cached data to the non-volatile memory by using a method of periodic hulk persistence, which forces write-back of the cached, data from the processor cache in bulks.

Further, the no-force write-back and bulk persistence specifically include: when the system failure occurs, if persistence of the committed data is not it to the non-volatile memory in time, recovering the committed data by using the replicas in the remaining, address spaces in the non-volatile memory; and in bulk persistence of the processor cache, writing back, by using the steal write-back technology, the uncommitted data during the execution of the transaction to the non-volatile memory.

Further, the method further includes: when multiple transactions are concurrently executed, if the multiple transactions update a same data block, implementing persistence of multiple versions of data to the non-volatile memory in an order in which the transactions are committed.

Further, the performing failure recovery processing on the transaction data when a system failure occurs further includes; extracting recorded data blocks and metadata blocks from the non-volatile memory according to a set format to Obtain state information of each data block, and thereby determining a committed state and an uncommitted state of each data block, and discarding the uncommitted data blocks; determining, according to information recorded by the corresponding metadata blocks, an order in which transactions corresponding to the committed data blocks are committed, and sorting the transactions; and performing a replay operation on the committed transactions according to the commit order.

According to a second aspect of the present invention, an apparatus for cache management of transaction processing in persistent memory is disclosed in an embodiment and includes: non-volatile memory, a processor cache, and a transaction processing module configured to: when a transaction starts, read old version data from the non-volatile memory to the processor cache, and execute the transaction; during the execution of the transaction, allocate a space to generated new version data, and use a steal write-back technology to allow persistence of uncommitted data; when the transaction is committed or aborted, implement forced persistence of transaction data to the non-volatile memory; after persistence of the transaction data is implemented to the non-volatile memory, write the transaction data back to original data addresses, and use a no-force write-back technology to relax persistence of committed data to the non-volatile memory, where the transaction processing module periodically implements persistence of cached data to the non-volatile memory using bulk persistence; and when a system failure occurs, perform failure recovery processing on the transaction data.

By using the apparatus for cache management of transaction processing in persistent memory according to the present invention, a space is allocated directly in the non-volatile memory to new version data during transaction processing, which reduces frequencies of temporary space allocation and data replication and improves memory utilization. In addition, persistence of uncommitted data to the non-volatile memory is allowed, which reduces the cost of tracking the state of the uncommitted data. In addition, the apparatus allows, by using persistent replicas of the committed data in remaining address spaces of the non-volatile memory, the committed data to be cached in the CPU cache instead of being forced persistence, which reduces overheads of data persistence. The apparatus has the following advantages: The transaction processing efficiency in the persistent memory is improved, and the transaction processing is implemented in program software without specific hardware support, thereby featuring better universality.

The additional aspects and advantages of the present invention will be provided in the following descriptions, and some of them will become more apparent in the following descriptions or he understood through the practice of the present invention.

BRIEF DESCRIPTION OF DRAWINGS

The foregoing and/or additional aspects and advantages of the present invention will become more apparent, and understandable in the following descriptions of the embodiments in combination with the accompanying drawings, where.

DESCRIPTION OF EMBODIMENTS

The following describes embodiments of the present invention in detail. Examples of the embodiments are illustrated in the accompanying drawings, where identical or similar numbers always represent identical or similar components or components having identical or similar functions. The following embodiments described with reference to the accompanying drawings are exemplary only and are only used to explain the present invention and should not be understood as limitations on the present invention.

In the descriptions of the present invention, it should be understood that directions or location relationships indicated by terms "center", "longitudinal", "lateral", "up", "down", "front", "rear", "left", "right", "vertical", "horizontal", "top", "bottom", "internal", and "external" are directions or location relationships based on the accompanying drawings, and are used only for describing the present invention and simplifying the descriptions, which do not indicate or imply that a corresponding apparatus or component must have a specific direction and he constructed and operated in a specific direction, and therefore should not be understood as limitations on the present invention. In addition, terms "first" and "second" are used only for description purposes and should not he understood as indications or implications of relative significance.

In the descriptions of the present invention, it should be noted that unless otherwise specified and defined, terms "installation", "interconnection" and "connection" should he understood in a broad sense, for example, the connection may be a fixed connection, a detachable connection or an integrated connection, may be a mechanical connection or an electrical connection, may be a direct connection or a connection through an intermediate medium, or may be an internal connection between two components. A person of ordinary skill in the art may understand specific meanings of the foregoing terms in the present invention according to actual situations.

The following describes, with reference to the accompanying drawings, the method and the apparatus for cache management of transaction processing according to the embodiments of the present invention.

Figure 1:
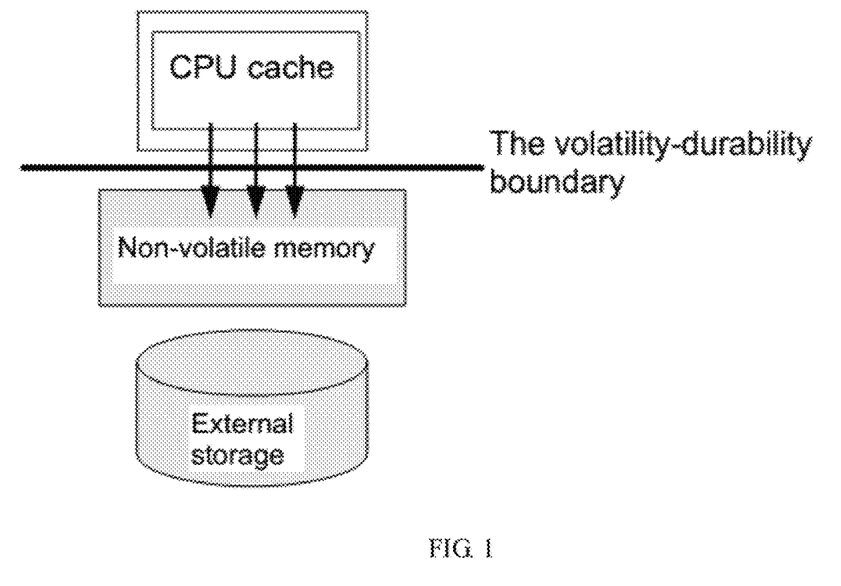
FIG. 1 is a schematic diagram of persistent memory in a method according to an embodiment of the present invention.

A persistent memory is a storage system that uses non-volatile memory as a memory medium and can provide data durability in the memory. The persistent memory is different from a conventional memory storage system in that the persistent memory uses non-volatile memory as the memory. FIG 1 shows a structural storage diagram of a persistent memory. The persistent memory includes CPU cache (that is, processor cache) and non-volatile memory. The CPU cache is a volatile storage, that is, data will be lost after a power failure of the system. The non-volatile memory includes but is not limited to a memory built by using a new type of byte-addressable non-volatile memory such as phase change memory (PCM), spin-torque transfer RAM (STT-RAM) or resistive RAM (RRAM) or a byte-addressable non-volatile memory using NVDIMM interface. The non-volatile memory does not lose data after a power failure of the system. The memory in the persistent memory may be a hybrid memory combining non-volatile memory and a volatile memory. The volatile memory includes DRAM memory. As shown in FIG. 1, conventional external storage, magnetic disks or solid state drives, can be used in combination with persistent memory, in order to provide a larger storage capacity. In this embodiment, the external storage does not serve as a part of the persistent memory.

Because the persistent memory provides data durability at the memory level, the volatility-durability boundary is located between the CPU cache and the memory. This is different from the conventional memory storage system. In the conventional memory storage system, the memory cannot provide data durability, and only the external storage can provide data durability, and therefore the volatility-durability boundary is located between the memory and the external storage. Due to this difference, in the persistent, memory, an operation of writing back from the CPU cache to the memory is called a persistent operation. The function of the persistent operation is to write data to non-volatile medium so that the data will not be lost after a power failure of the system.

A transaction mechanism is used to maintain data. consistency of the storage system. Herein, write-ahead logging in the transaction mechanism is used as an example. The execution of a transaction in write-ahead logging is mainly divided into three phases an execution phase, a log phase, and a checkpoint phase. In the execution phase, transaction data is read from the persistent storage to the cache for execution, and new version data is generated. In the log phase, the new version data is written to a log and is written persistently to the persistent storage,. After a transaction is committed, the transaction enters the checkpoint phase. In the checkpoint phase, the transaction data is replicated to the original locations of the data and is written back to the persistent storage. During the execution of the transaction, a transaction processing module should protect the old version data from being damaged before the new version data is persistently written to the persistent storage, that is, the transaction processing module needs to maintain a complete version in the persistent storage at any time. In addition, the transaction requires that the new version data should be persistently written back to the persistent storage in time to provide a durability feature of the transaction. This requires that the cache management of transaction processing should maintain and track uncommitted data and to-he-persisted data, prevent the uncommitted data from being written back, and implement persistence of the to-be-persisted data in time.

In the persistent memory, the transaction processing module divides the memory area into an execution area, a data area, and a log area. The execution area is used as a data allocation space in the transaction execution phase, and is mainly used to store the uncommitted data. The data area is an address space where the transaction data is stored persistently, and stores old version data of the transaction before the transaction is committed and stores new version data after the transaction is committed. The log area is used in the transaction write-ahead log technology to temporarily store the new version data of the transaction before the checkpoint phase. In these three areas, the execution area can be allocated either in the volatile memory or in the nom-volatile. memory. The data area and the log area can only be allocated in the non-volatile memory. Although the three areas are allocated in the memory, the CPU cache can cache data of any one area according to a cache mapping relationship. in the CPU cache, areas to which each cache block belongs to are determined according to memory areas to which data blocks cached in each cache block belong. Therefore, in the present invention, areas in the non-volatile memory are also called persistent areas, for example, a persistent log area and a persistent data area, while areas in the volatile cache are volatile areas, for example, a volatile log area and a volatile data area.

The method for cache management of transaction processing in persistent memory according to this embodiment of the present invention includes the following steps:

when a transaction starts, a transaction processing module reads old version data from non-volatile memory to processor cache, and executes the transaction;

during the execution of the transaction, the transaction processing module allocates a space to generated new version data, and uses a steal write-back technology to allow persistence of uncommitted data;

when the transaction is committed or aborted, the transaction processing module implements forced persistence of transaction data to the non-volatile memory;

after persistence of the transaction data is implemented to the non-volatile memory, the transaction processing module writes the transaction data back to original data addresses, and uses a no-force write-back technology to relax persistence of committed data to the non-volatile memory;

where the transaction processing module periodically implements persistence of cached data to the non-volatile memory using bulk persistence; and when a system failure occurs, the transaction processing module performs failure recovery processing on the transaction data.

It should be noted that in the persistent memory built by using non-volatile memory as the primary storage, a steal write-back technology and a no-three write-back technology are used to relax the requirement on persistence of the transaction data in the CPU cache to the non-volatile memory, which reduces overheads of transaction data or state maintenance and persistence.

In an embodiment of the present invention, the persistent memory includes volatile, processor cache and non-volatile memory; and the transaction data is first cached in the volatile processor cache, and is written back to the non-volatile memory in an ascending order of dependencies to ensure data consistency.

In an embodiment of the present invention, the steal write-back technology of the persistent memory includes: during the execution of the transaction, allocating, directly in the non-volatile memory, a space to new version data generated by the transaction to avoid performing a replication operation on the data; and recording a log area by using a data organization manner in a fixed format, and allocating corresponding metadata to a data block to enable data block state detection after the system failure, where the metadata block is used' to record description information of the data block.

In an embodiment of the present invention, the steal write-hack technology of the persistent memory further includes: if the transaction is aborted, performing the following marking on data blocks of the aborted transaction in the metadata: for data blocks that are allocated a memory space and are written back to the non-volatile memory and data blocks that are allocated a memory space but are not written back to the non-volatile memory yet, marking the data blocks of the aborted transaction by using metadata tags; and for data blocks that are not allocated a memory space, discarding the data blocks directly.

In an embodiment of the present invention, the no-force write-back technology of the persistent memory includes: when the transaction is committed, replicating the committed data to locations of the old version data, and if there is a persistent replica in remaining address spaces of the non-volatile memory, allowing the data copy to be cached in the processor cache; and delaying persistence of the cached data to the non-volatile memory by using a method of periodic bulk persistence, which forces write-back of the cached data from the processor cache in bulks.

In an embodiment of the present invention, the no-force write-back and bulk persistence specifically include: when the system failure occurs, if persistence of the committed data is not implemented to the non-volatile memory in time, recovering the committed data by using the replicas in the remaining address spaces in the non-volatile memory; and in hulk persistence of the processor cache, writing back, by using the steal write-back technology, the uncommitted data during the execution of the transaction to the non-volatile memory.

In an embodiment of the present invention, the method further includes: when multiple transactions are concurrently executed, if the multiple transactions update a same data block, implementing persistence of multiple versions of data to the non-volatile memory in an order in which the transactions are committed.

In an embodiment of the present invention, the performing failure recovery processing on the transaction data when a system failure occurs further includes: extracting recorded data blocks and metadata blocks from the non-volatile memory according to a set format to obtain state information of each data block, and thereby determining the committed or uncommitted state of each data block, and discarding the uncommitted data blocks; determining, according to information recorded by, the corresponding metadata blocks, an order in which transactions corresponding to the committed data blocks are committed, and sorting the transactions; and performing a replay operation on the committed transactions according to the commit order.

Figure 2:
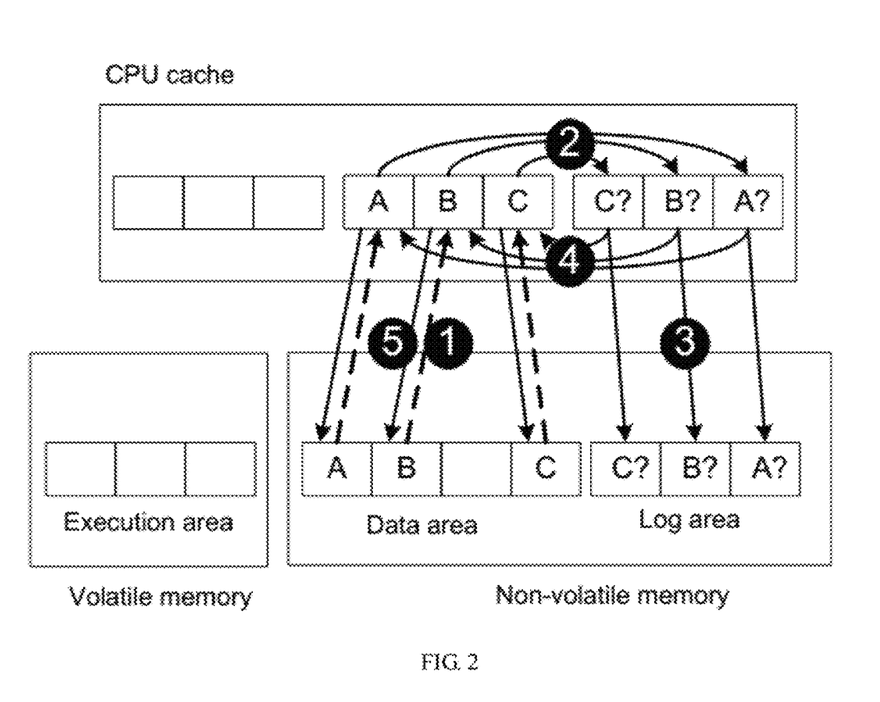
FIG. 2 is a schematic diagram of a data flow and processing method in a method for cache management, of transaction processing in persistent, memory according to the present invention.

FIG. 2 illustrates a data flow and processing method in a method for cache management of transaction processing in persistent memory according to an embodiment of the present invention, where the method includes the following steps:

after a transaction starts, a transaction processing module reads old version data from a persistent data area to a volatile data area;

during execution of the transaction, the transaction processing module allocates a space in a lot area to new version data generated by the transaction;

during the execution of the transaction, data generated by the transaction includes temporary data and new version transaction data: for the generated temporary data, the transaction processing module writes it to the execution area; and for the generated new version transaction data, the transaction processing module writes it to the log area;

for the new version transaction data that is written to the log area, because the CPU cache management is hardware management, the program software cannot prevent persistence of this part of data to the persistent log area; with respect to this problem, the method of the present invention provides a steal write-back technology to ensure the correctness, and this technology will be described in detail later;

when the transaction is committed or aborted, the transaction processing module implements forced persistence of transaction data to the persistent log area data;

if the transaction is in a committed state, the transaction processing module implements forced persistence of the new version data generated by the transaction to the persistent log area, and keeps a transaction commit record in the persistent log area;

if the transaction is in an aborted state, the transaction processing module discards the new version data generated by the transaction, and keeps a transaction abort record in the persistent log area;

after persistence the transaction data or state is implemented to the persistent log area, the transaction data is written back to the data area;

for the committed transaction, the new version transaction data is replicated from the log area to the data area; and data in the data area is updated to new version data;

for the aborted transaction, the new version transaction data is discarded; and the data area maintains the old version data;

of the transaction data is implemented to the persistent data area;

The method of the present invention provides a no-force write-back technology, where before the transaction notifies the program that the transaction is completed, the transaction processing module does not implement forced persistence of data of the volatile data area to the persistent area, but implements persistence of the data of the data area by means of bulk persistence with other transactions. This technology will be described in detail later.

Up to now, the transaction processing is executed completely under a circumstance in which the system works normally.

The apparatus for cache management of transaction processing in persistent memory is the persistent memory using the method for cache management of transaction processing in persistent memory according to the present invention.

Figure 3:
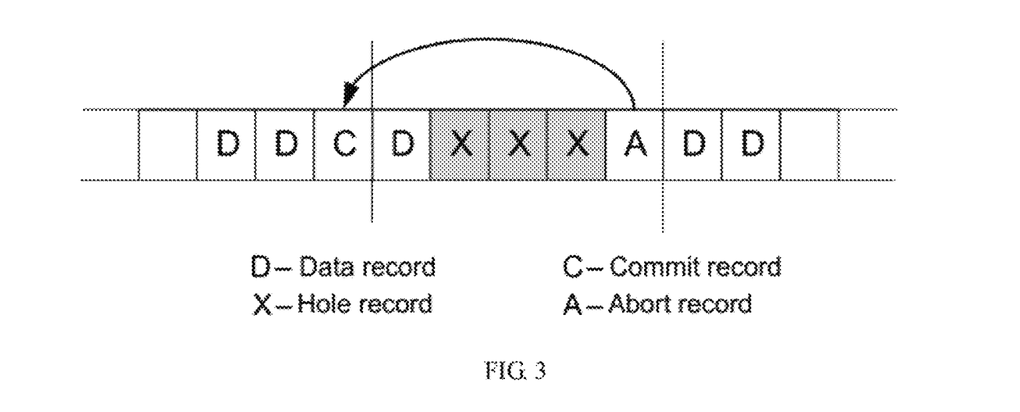
FIG. 3 is a schematic diagram of a log format in a steal write-back technology according to the present invention

The steal write-back technology of the method of the present invention allows the data to be written to the log area before the data is committed, and meanwhile allows the uncommitted data to be written persistently to the persistent log. The method used by this technology includes but is not limited to a log organization manner in a fixed format. FIG. 3 illustrates a log organization manner in a fixed format, In the program, each thread maintains its own log, area, which ensures that only one transaction in each log area is being updated. However, an initial address of each log area is globally visible, which ensures that when a transaction is recovered, all log data can be found. In each log, all data is written in sequence. Because only one transaction is being executed in each log at the same time, it can be ensured that data of the same transaction is written sequence. At the end of a log recorded by each transaction, the transaction keeps one commit or abort record according to the committed state or aborted state of the transaction.

Figure 4:
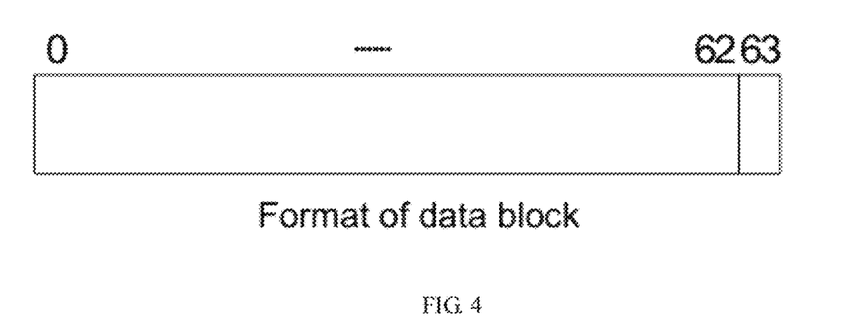
FIG. 4 is a schematic diagram of a format of a log data block in log records according to the present invention
Figure 5:
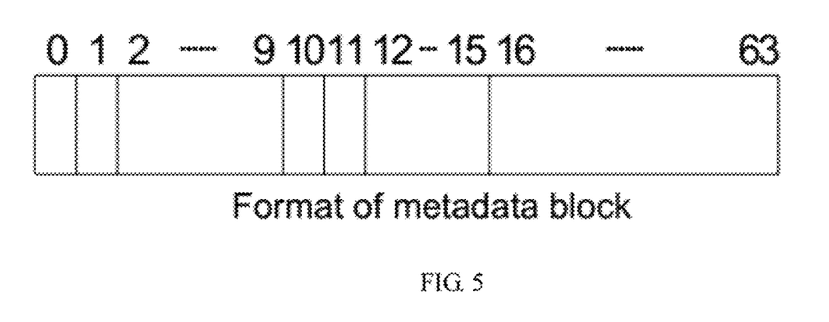
FIG. 5 is a schematic diagram of a format of a log metadata block in log records according to the present invention.

For the committed transaction, the transaction needs only to fill in the transaction state correctly in the commit record. A log record can he a log data record, a commit record, or an abort record. Each record of the foregoing records includes a log data block and a log metadata block. An internal specific format of each record is illustrated in FIG. 4 and FIG. 5, and will he described in detail later.

For the aborted transaction, the transaction needs to fill in the transaction state correctly in the abort record, and also needs to add, to the log data block of the abort record, an address pointing to a commit record of the last committed transaction. FIG. 3 illustrates the use of the pointer. In the aborted transaction, the persistent log area includes two data records: one is a record of persistent data of the aborted transaction, and the other is a record of data that is allocated a space but is not actually written, of the aborted transaction.

The second data record is also called a hole. In the abort record, the practice of using a pointer to point to the commit record address of the last committed transaction may also check hole records during failure recovery, so that the hole records can be processed correctly.

Each log record includes a log data block and a log metadata block. The log data block records content of the transaction data, and the log metadata block records description information of the corresponding log data block.

FIG. 4 illustrates a format of a log data block. In this example, a 64-bit space is allocated to each log data block. In the 64 bits, the last bit (TomBit) is used to indicate whether a mark is written, and the remaining bits are used to record transaction data.

FIG. 5 illustrates a format of a log metadata block. In this example, a 64-bit space is allocated to each log metadata block. In the 64 bits:

the first bit (TomBit) is used to indicate whether a mark is written, that is, marking whether the metadata block is written successfully;

the second bit (TailBit) is used to record the last bit data in the data block, that is, it is used to store a bit that overflows due to occupancy of the TomBit in the log data block;

the 3<rd>bit to the 10thbit (MASK) are used to record a bitmap indicating whether each byte in the data block is valid, that is, if one bit is set, the corresponding byte in the log data block is marked as a valid byte;

the 11thbit ($FLG_{13}$ DC) is used to mark whether the record is a data record or a commit/abort record;

the 12thbit ($FLG_{13}$ CA) is used to further mark the record as a commit record or an abort record if the record is a commit/abort record;

the 13thbit to the 16thbit (RESV) are reserved fields and are not used at present and the 17thbit to the 64thbit (ADDR) record an address of the log data block in the data area in the record.

By using the foregoing manners, the log area is organized in a fixed format, metadata is marked in each data block, and uncommitted data is permitted to be written persistently to the persistent log area, During failure recovery of the system, the log data blocks are checked by using the log metadata blocks, and uncommitted data can be detected for data recovery. In this manner, the steal write-back technology of the present invention can he correctly used in the persistent memory, which reduces frequencies of replicating newly generated version data between the data area, the execution area, and the log area, reduces cache management overheads of preventing persistence of the uncommitted data, and improves the transaction processing performance in the persistent, memory.

By using the no-force write-back technology in the method of the present invention, the committed data is checkpointed to the data area, and this part of data is allowed to be cached in the CPU cache, and is not forcibly flushed back to the persistent data area. This technology periodically flushes back data in bulks, for example, it forcibly flushes back the data in the whole CPU cache to ensure the data durability periodically, and notifies the program software to perform subsequent processing. The technology in the method of the present invention provides data durability by using other persistent replicas of the data in the persistent memory, and meanwhile controls the order of writing back multiple versions of data in the CPU cache to ensure that data versions are updated correctly.

During the execution of the transaction, after the committed data is checkpointed to the data area, a part of the data has already been written to the persistent data area due to reasons such as cache replacement, while the remaining data is cached in the CPC cache. After a system failure occurs, the data in the CPU cache is lost, and the persistent data area can be recovered by using the persistent data replicas in the persistent log area.

In the process of periodical bulk persistence, the data in the CPU cache including the uncommitted data is forcibly written back to the non-volatile memory. For the uncommitted data, (1) if the data is located in the execution area, persistent data is not damaged because the execution area does not include persistent data:, (2) if the data is located in the log area, a judgment may be made by using, the log format according to the steal write-back technology of the present invention; (3) if the data is located in the data area, because the data has already been committed, the persistent data is supposed to be updated to new version data, that is, the data is flushed back.

Figure 6:
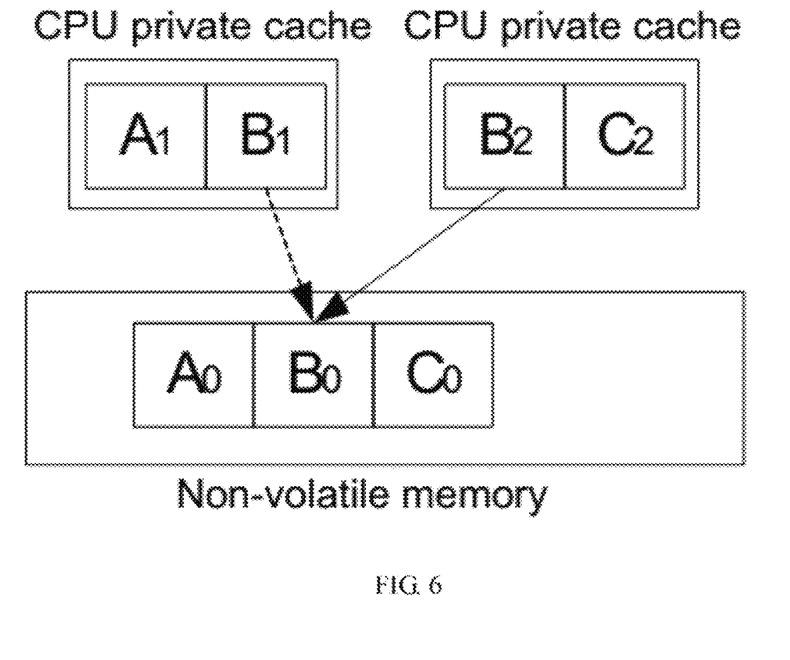
FIG. 6 is a schematic diagram of an order in which multiple versions of data are written back in a multi transaction contention in a no-force write-back technology according to the present invention.

In the no-force write-back technology of the present invention, when multiple transactions contend, the order of persistence of different versions of the same data needs to be ensured. FIG. 6 illustrates how to ensure the order of writing back multiple versions of data in the no-force write-back technology. In this example, transaction 1 includes two data records A and B, while transaction 2 includes two data records B and C. Transaction 1 is committed. earlier than transaction 2. In the no-force write-back technology, data record B has two data versions in the CPU cache, where the two, data versions belong to transaction 1 and transaction 2 respectively. In the no-force write-back technology, to prevent data inconsistency due to write-back disorder of the persistent version, persistence of the data records is implemented according to an order in which the transactions are committed. In the example shown in FIG. 6, persistence of record B in transaction 2 must he implemented later than record B in transaction 1.

In the foregoing manner, remaining persistent replicas of the data record in the persistent memory are used to provide data durability, and the order of persistence of multiple versions of the same data is maintained under a condition that multiple transactions contend, which allows the committed data to be checkpointed to the data area, instead of implementing forced persistence in the persistent data area. The no-force write-back technology described in the method of the present invention can be correctly executed in the persistent memory, which reduces the number of forced write-backs of data blocks, reduces costs of write-back and waiting of the transaction data, and improves the transaction processing performance in the persistent memory.

In the method and apparatus of the present invention, data recovery is performed after a system failure occurs, where the failure recovery is executed according to the following three steps:

(1) Read log area data from the non-volatile, memory, and extract metadata blocks according to a set grouping format to obtain state information of each data block, and thereby determine the committed or uncommitted state of each data block, and discard the uncommitted data blocks.

(2) For the committed data blocks, determine, according to information recorded by the corresponding metadata blocks, an order in which corresponding transactions are committed, and sort the committed transactions.

(3) For the committed transactions, perform a replay operation according to the commit order.

In the method for cache management of transaction processing in persistent memory according to the present invention, a space is allocated directly in the non-volatile memory to new version data during transaction processing, which reduces frequencies of temporary space allocation and data replication and improves memory utilization. In addition, persistence of uncommitted data to the non-volatile memory is allowed, which reduces the cost of tracking the state of the uncommitted data. In addition, the method allows, by using persistent replicas of the committed data in remaining address spaces of the non-volatile memory, the committed data to be cached in the CPU cache instead of implementing forced persistence, which reduces overheads of data persistence, The method has the following, advantages: The transaction processing efficiency in the persistent memory is improved, and the transaction processing is implemented in program software without specific hardware support, thereby featuring better universality.

The present invention further discloses an apparatus for cache management of transaction processing in persistent memory. The apparatus includes non-volatile memory, processor cache, and a transaction processing module configured to: when a transaction starts, read old version data from the non-volatile memory to the processor cache, and execute the transaction: during the execution of the transaction, allocate a space to generated new version data, and use a steal write-back technology to allow persistence of uncommitted data; when the transaction is committed or aborted, implement forced persistence of transaction data to the non-volatile memory; after persistence of the transaction data is implemented to the non-volatile memory, write the transaction data back to original data addresses, and use a no-force write-back technology to relax persistence of committed data to the non-volatile memory, where the transaction processing module periodically implements persistence of cached data to the non-volatile memory using bulk persistence; and when a system failure occurs, perform failure recovery processing on the transaction data.

By using the apparatus for cache management of transaction processing in persistent memory according to the present invention, a space is allocated directly in the non-volatile memory to new version data during transaction processing, which reduces frequencies of temporary space allocation and data replication and improves memory utilization. In addition, persistence. of uncommitted data to the non-volatile memory, is allowed, which reduces the cost of tracking the state of the uncommitted data. In addition, the apparatus allows, by using persistent replicas of the committed data in remaining address spaces of the non-volatile memory, the committed data to be cached in the CPU cache instead of implementing forced persistence, which reduces overheads of data persistence. The apparatus has the following advantages: The transaction processing efficiency in the persistent memory is improved, and the transaction processing is implemented in program software without specific hardware support, thereby featuring better universality.

It should be noted that the specific implementation manner of the apparatus for cache management of transaction processing in persistent memory according to the embodiment of the present invention is similar to the specific implementation manner of the method for cache management of transaction processing in persistent memory according to the embodiment of the present invention. For details, reference may be made to the description of the method, which will not be further described, Although the embodiments of the present invention have been illustrated and described hereinbefore, it may be understood that the foregoing embodiments are exemplary only and should not he understood as limitations on the present

What is claimed is:

1. A method for improving cache management of transaction processing in persistent memory, comprising the following steps:
  when a transaction starts, reading, by a transaction processing module, old version data from non-volatile memory to a processor cache, and executing, by the transaction processing module, the transaction;
  during the execution of the transaction, allocating, by the transaction processing module, a space to generated new version data, and implementing persistence of uncommitted data by using a steal write-back, wherein the steal write-back comprises:
  during the execution of the transaction, allocating, directly in the non-volatile memory, a space to new version data, generated by the transaction to avoid performing a replication operation on data, and
  recording a log area by using a data organization manner in a fixed format, and allocating corresponding metadata to a data block to implement data block state detection after a system failure,
  wherein the data block is used to record description information of the data block;
  when the transaction is committed or aborted, implementing forced persistence of transaction data to the non-volatile memory;
  after persistence of the transaction data is implemented to the non-volatile memory, writing the transaction data back to original data addresses, and relaxing persistence of committed data to the non-volatile memory by using a no-force write-back, wherein the no-force write-back comprises:
  when, the transaction is committed, replicating the committed data to locations of the old version data and if there is a persistent replica in remaining address spaces of the non-volatile memory, allowing the replica to be cached in the processor cache, and delaying persistence of the cached replica data to the non-volatile memory by using periodic bulk persistence;
  wherein the transaction processing module periodically implements persistence of cached data to the non-volatile memory using bulk persistence;
  wherein the bulk persistence forces write-back of the cached data from the processor cache in bulks; and
  when a system failure occurs, performing failure recovery processing on the transaction data.

2. The method according to claim 1, wherein the persistent memory comprises volatile processor cache and non-volatile memory; and the transaction data is first cached in the volatile processor cache, and is written back to the non-volatile memory in an ascending order of dependencies to ensure data consistency.

3. The method according to claim 1, wherein the steal write-back in persistent memory further comprises:
  if the transaction is aborted, performing the following marking on data blocks of the aborted transaction in the metadata:
  for data blocks that are allocated a memory space and are written back to the non-volatile memory and data blocks that are allocated a memory space but are not written back to the non-volatile memory yet, marking the data blocks of the aborted transaction by using metadata tags; and
  for data blocks that are not allocated a memory space, discarding the data blocks directly.

4. The method according to claim 1, wherein the no-force write-back and the bulk persistence specifically comprise;
  when the system failure occurs, if persistence of the committed data is not implemented to the non-volatile memory in time, recovering the committed data by using the replica in the remaining address spaces in the non-volatile memory; and
  in no-force write-back of the processor cache, writing hack, by using the steal write-back, the uncommitted data during the execution of the transaction to the non-volatile memory.

5. The method according to claim 1, further comprising: when multiple transactions are concurrently executed, if the multiple transactions update a same data block, implementing persistence of multiple versions of data to the non-volatile memory in an order in which the transactions are committed.

6. The method according to claim 1, wherein the performing failure recovery processing on the transaction data when a system failure occurs further comprises:
  extracting recorded data blocks and metadata blocks from the non-volatile memory according to a set format to obtain state information of each data block, and thereby determining committed or uncommitted state of each data block, and discarding the uncommitted data blocks;
  determining, according to information recorded by corresponding metadata blocks, an order in which transactions corresponding to the committed data blocks are committed, and sorting the committed transactions; and
  performing a replay operation on the committed transactions according to the commit order.

7. An apparatus for improving cache management of transaction processing in persistent memory, comprising:
  non-volatile memory;
  a processor cache; and
  a transaction processing module, configured to: when a transaction starts, read old version data from the non-volatile memory to the processor cache, and execute the transaction; during the execution of the transaction, allocate a space to generated new version data, and implement persistence of uncommitted data by using a steal write-back, wherein the steal write-back comprises: during the execution of the transaction, allocating, directly in the non-volatile memory, a space to new version data generated by the transaction to avoid performing a replication operation on data; and recording a log area by using a data organization manner in a fixed format, and allocating corresponding metadata to a data block to implement data block state detection after a system failure, wherein the data block is used to record description information of the data block; when the transaction is committed or aborted, implement, forced persistence of transaction data to the non-volatile memory; after persistence of the transaction data is implemented to the non-volatile memory, write the transaction data back to original data addresses, and relax persistence of committed data to the non-volatile memory by using a no-force write-back, wherein the no-force write-back, comprises: when the transaction is committed, replicating the committed data to locations of the old version data, and if there is a persistent replica in remaining address spaces of the non-volatile memory, allowing the replica to be cached in the processor cache; and delaying persistence of the cached replica to the non-volatile memory by using periodic bulk persistence, wherein the transaction processing module periodically implements persistence of cached data to the non-volatile memory using bulk persistence, wherein the bulk persistence forces write-back of the cached data from the processor cache in bulks, and when a system failure occurs, perform failure recovery processing on the transaction data.

* * * * *